Figures 1, 2, 3:
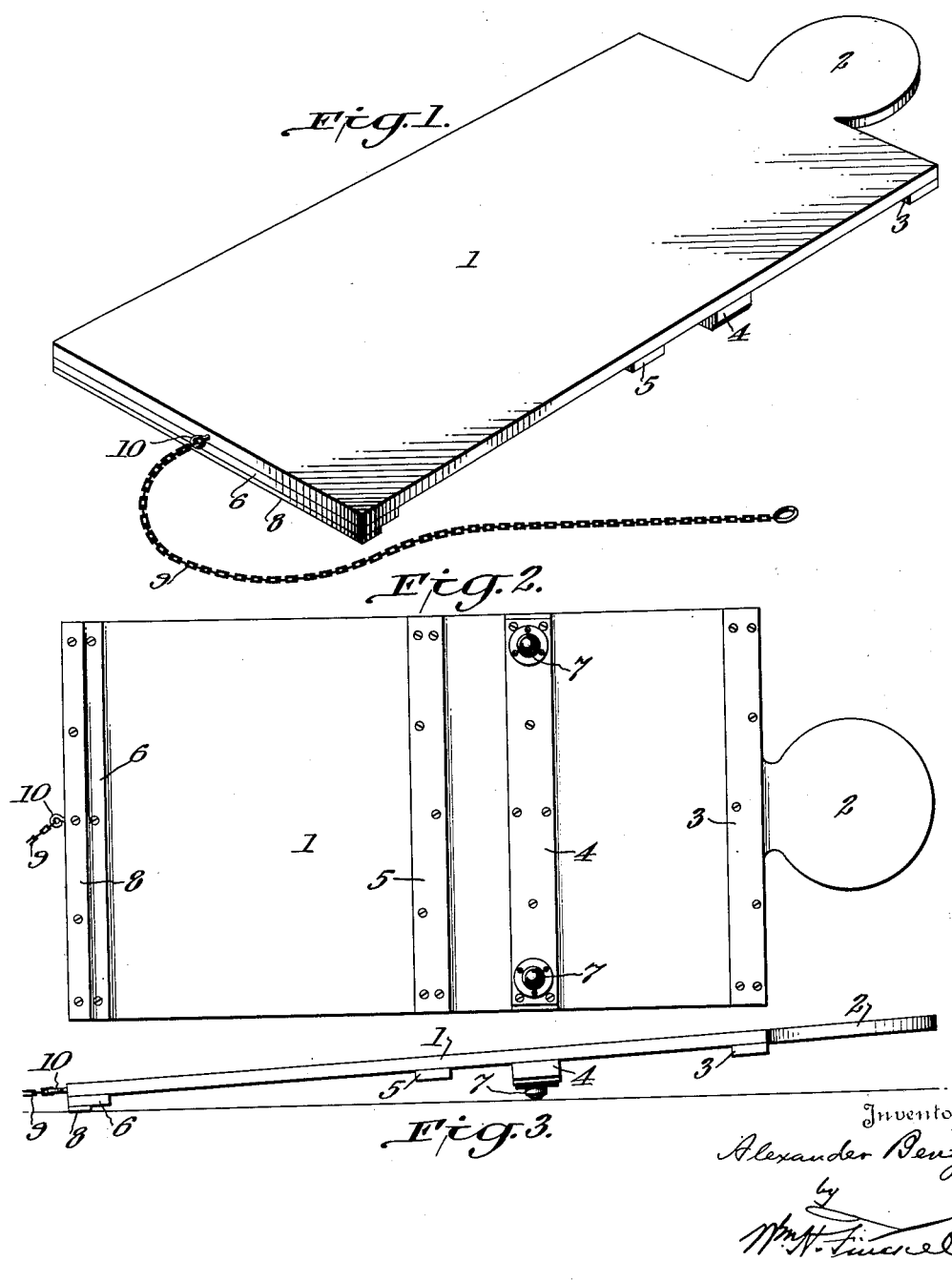

March 31, 1925.  1,531,536

A. BENZ

CREEPER

Filed April 28, 1923

Inventor:
Alexander Benz
by
Attorney

Patented Mar. 31, 1925.

1,531,536

UNITED STATES PATENT OFFICE.

ALEXANDER BENZ, OF WASHINGTON, DISTRICT OF COLUMBIA.

CREEPER.

Application filed April 28, 1923. Serial No. 635,314.

*To all whom it may concern:*

Be it known that I, ALEXANDER BENZ, a citizen of the United States, residing at Washington, in the District of Columbia, have invented a certain new and useful Improvement in Creepers, of which the following is a full, clear, and exact description.

Persons working under automobiles and other motor vehicles use a wheeled truck, commonly called a creeper, on which they may lie supine so as to accommodate their bodies to the limited space beneath the vehicle. These creepers have been made with swiveled casters, such as are used on furniture, so as to enable the user to move about beneath the vehicle in order to accommodate himself to the part to be acted upon for repairs, adjustment, or renewal.

The object of the invention is to provide a creeper which may be readily moved in any direction, and when moved into the desired position will remain and resist accidental movement.

The invention consists of a creeper, having its rotatable supports located in line with one another and slightly to one side of a line drawn transversely approximately midway between the ends of the creeper and nearer the leading end of the creeper, so that the normal tendency of the creeper is to drop at one end and thus serve as a sort of drag to prevent the accidental movement of the creeper.

The invention also consists in providing a creeper with ball casters, so as to eliminate the sidewise jerky movement incident to the use of the swiveled casters of prior constructions.

Having thus stated in general terms the nature of the invention, I will proceed now more fully to explain the same and finally claim it.

In the accompanying drawings illustrating the invention, in the several figures of which like parts are similarly designated, Figure 1 is a perspective view. Fig. 2 is an inverted plan view. Fig. 3 is a side elevation.

The body or platform member 1 may be of any approved construction and material, preferably provided with an off-standing head-rest 2 at its leading end. The platform may be reinforced by the transverse battens 3, 4, 5 and 6, or other desired number, and one of these battens, 4 is located beyond or to one side of the transverse center of the platform, and is provided with oppositely arranged rollers, preferably ball casters, 7 of any usual or approved construction; while the batten 6 is provided with a metal strip 8 which serves not only as a reinforce, but also as a drag or counterweight and a wear-resisting medium.

The creeper thus constituted may be provided with a chain or other flexible medium 9, secured thereto as by a screw-eye 10, and affording means for dragging the creeper from place to place.

As seen in Fig. 3, the normal position of the creeper is with its reinforced end touching the ground and its head-rest end elevated, and this will be the position it will naturally assume when a person is supine thereon, so that the reinforced end may serve as a sort of drag to prevent the accidental movement of the creeper while a workman is occupied thereon. The workman by shifting his position, or by using his hands or his feet, may raise the declined end of the creeper so as to permit him to move the creeper and himself readily from place to place and in any direction, as may be desired. The use of ball casters, particularly in transversely opposite arrangement, greatly promotes this facility of movement.

As already indicated, these creepers are commonly used by repairmen and others when engaged in work beneath an automobile or truck or other motor vehicle, but it is obvious that the creeper may be used under hot-house benches and other structures where underneath work can be performed only by the workman assuming a cramped or supine position. The device also may be used as a truck in packing rooms or buildings, for moving goods or packages of goods from place to place.

It will be understood that the head-rest may be omitted or modified in form, or it may be a part of or an attachment to the platform; and this head-rest may be padded, if desired, to add to the comfort of the user when lying thereon.

The invention is not limited to any particular material for the construction of the creeper. Wood, metal, or other material may be used. Nor is it necessary to place the casters on a batten. It is advisable, however, that the casters be of or be given a height sufficient to raise the platform well above the ground so as to insure freedom of movement. While a pair of oppositely arranged ball casters is the preferred construction, additional casters or rollers may be used if arranged between the leading end and the center of the creeper.

Variations in the details of construction are permissible within the principle of the invention and the scope of the claims following.

What I claim is:—

1. A creeper, having a platform mounted upon rollers located in line with one another and slightly to one side of a line drawn transversely approximately midway between the ends of the platform and nearer the leading end thereof, the rear end unsupported and free to rise from and fall to the floor.

2. A creeper, having a platform mounted upon rollers arranged beneath the same and solely to that side of the transverse center thereof nearer the leading end of the platform, whereby one end is normally declined, said declined end serving as a drag to prevent the accidental movement of the creeper.

3. A creeper, having a platform mounted upon ball casters arranged beneath the same and solely to that side of the transverse center thereof nearer the leading end of the platform, said platform provided with a reinforcing element across its rear end and a metal strip underlying said element, said strip serving as a reinforce and also as a counterweight and as a wear-resisting element, the creeper having a tipping action on its ball casters as well as being capable of longitudinal and sidewise movements thereon.

In testimony whereof I have hereunto set my hand this 26th day of April, A. D. 1923.

ALEXANDER BENZ.

Witnesses:
A. DENEKAS,
JOHN T. CLANCEY.